United States Patent
Chang et al.

(10) Patent No.: US 9,891,758 B2
(45) Date of Patent: *Feb. 13, 2018

(54) ZOOM GESTURE DETERMINATION METHOD AND TOUCH CONTROL CHIP

(75) Inventors: Hui-Hung Chang, Keelung (TW); Chih-Chang Lai, Taichung (TW)

(73) Assignee: NOVATEK Microelectronics Corp., Hsin-Chu (TW)

(*) Notice: Subject to any disclaimer, the term of this patent is extended or adjusted under 35 U.S.C. 154(b) by 117 days.

This patent is subject to a terminal disclaimer.

(21) Appl. No.: 13/557,224

(22) Filed: Jul. 25, 2012

(65) Prior Publication Data
US 2013/0027331 A1 Jan. 31, 2013

(30) Foreign Application Priority Data
Jul. 25, 2011 (CN) .......................... 2011 1 0208571

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04806* (2013.01)

(58) Field of Classification Search
CPC .................. G06F 3/044; G06F 3/0416; G06F 2203/04806; G06F 3/04883; G06F 2203/04808
See application file for complete search history.

(56) References Cited

U.S. PATENT DOCUMENTS

| | | | | |
|---|---|---|---|---|
| 5,864,105 | A * | 1/1999 | Andrews | 200/5 R |
| 7,743,348 | B2 | 6/2010 | Robbins | |
| 7,834,856 | B2 * | 11/2010 | Grinshpoon et al. | 345/173 |
| 8,482,536 | B1 * | 7/2013 | Young | 345/173 |
| 2006/0001650 | A1 * | 1/2006 | Robbins et al. | 345/173 |
| 2006/0026521 | A1 * | 2/2006 | Hotelling et al. | 715/702 |
| 2006/0026536 | A1 * | 2/2006 | Hotelling | G06F 3/0418 715/863 |
| 2007/0252821 | A1 * | 11/2007 | Hollemans | G06F 3/0416 345/173 |
| 2007/0268273 | A1 * | 11/2007 | Westerman | G06F 3/0235 345/173 |
| 2009/0307589 | A1 * | 12/2009 | Inose et al. | 715/702 |
| 2011/0013049 | A1 * | 1/2011 | Thorn | G06F 3/0488 348/240.3 |
| 2011/0080351 | A1 * | 4/2011 | Wikkerink et al. | 345/173 |
| 2011/0234522 | A1 * | 9/2011 | Lin et al. | 345/173 |
| 2011/0291984 | A1 * | 12/2011 | Chang | G06F 3/0416 345/174 |
| 2013/0278541 | A1 * | 10/2013 | Hernandez | G06F 3/045 345/174 |

FOREIGN PATENT DOCUMENTS

| | | |
|---|---|---|
| CN | 101482795 A | 7/2009 |
| TW | 201122954 | 7/2011 |

* cited by examiner

*Primary Examiner* — Gerald Johnson
(74) *Attorney, Agent, or Firm* — Winston Hsu (57) ABSTRACT

A zoom gesture determination method for a touch control device includes detecting a first touch point and a second touch point; determining a position difference between the first touch point and the second touch point; and deciding a zoom gesture represented by the first touch point and the second touch point according to variations in the position difference.

18 Claims, 8 Drawing Sheets

ZOOM GESTURE DETERMINATION METHOD AND TOUCH CONTROL CHIP

BACKGROUND OF THE INVENTION

1. Field of the Invention

The present invention relates to a zoom gesture determination method and touch control chip, and more particularly, to a zoom gesture determination method and touch control chip that can be utilized in a self-capacitative touch control device.

2. Description of the Prior Art

A touch control device has the benefits of ease of operation, fast reaction and space efficiency. These features allow users to perform operations more intuitively and conveniently; consequently, touch control devices have become important input interfaces that are widely utilized in various consumer electronic products. Specifically, a touch control device utilizes a detection circuit to detect electrical signals of a matrix composed of a plurality of wires, and convert the electrical signals into digital detection data values to determine a touch event. A conventional touch control device is mostly suited for single touch point operations, and faulty determination may occur in multiple touch point operations.

Figure 1:
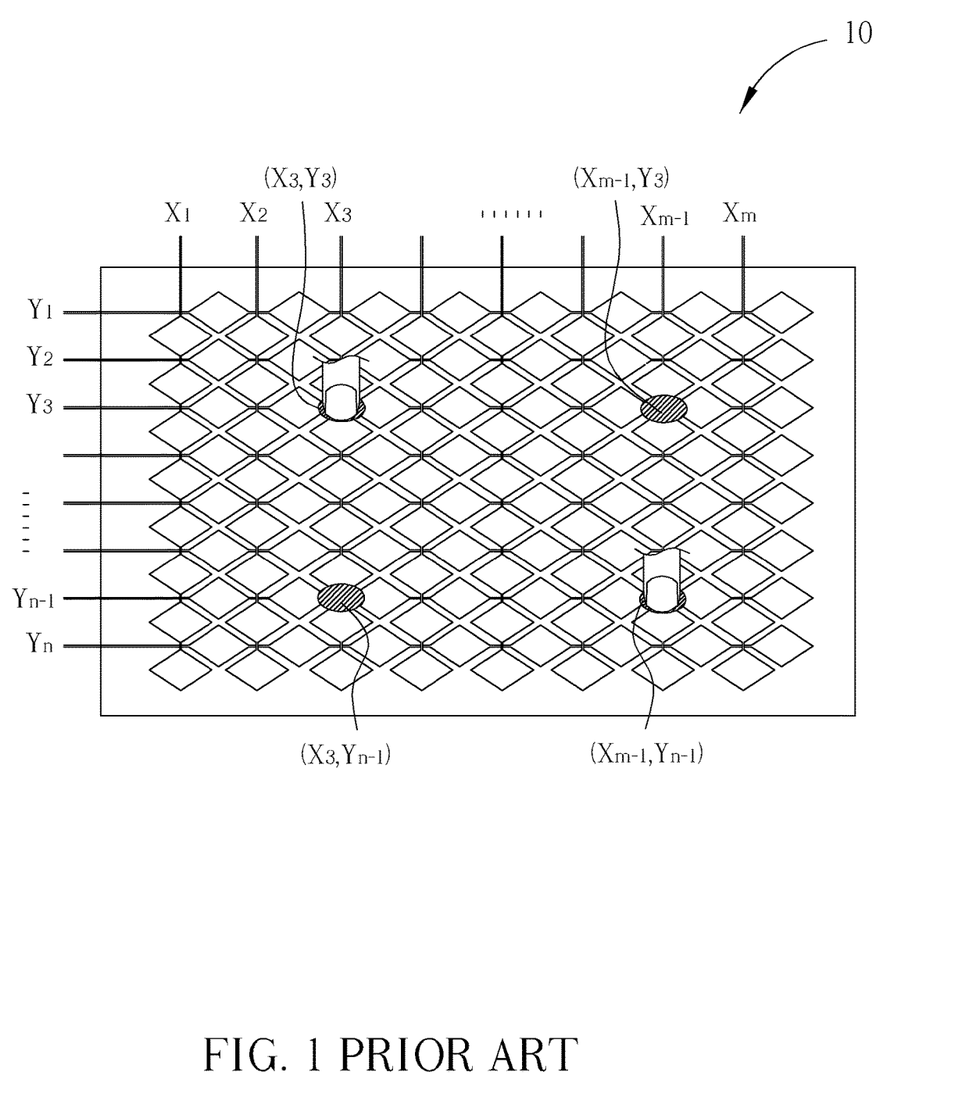
FIG. 1 is a schematic diagram of a projected capacitive touch sensing device of the prior art.

Please refer to FIG. 1, which is a schematic diagram of a projected capacitive touch sensing device 10 of the prior art. The projected capacitive touch sensing device 10 includes sensing capacitor strings $X_1$-$X_m$ and $Y_1$-$Y_n$. Each sensing capacitor string is a one-dimensional structure formed by connecting a plurality of sensing capacitors in series. The conventional touch sensing method detects the capacitance in each sensing capacitor string to determine whether a touch event occurs. The sensing capacitor strings $X_1$-$X_m$ and $Y_1$-$Y_n$ are utilized to determine vertical and horizontal touch events, respectively. In the case of horizontal operations, assume the sensing capacitor string $X_1$ has Q sensing capacitors, and each sensing capacitor has a capacitance of C. Under normal circumstances, the sensing capacitor string $X_1$ has a capacitance of QC. If a difference in capacitance caused by a human body (e.g. a finger) touching a sensing capacitor of the sensing capacitor string $X_1$ is $\Delta C$, it can be inferred that the finger is touching a certain point on the sensing capacitor string $X_1$ when the capacitance of the sensing capacitor string $X_1$ is detected to be greater than or equal to "QC+$\Delta C$". For multi-touch operations, as shown in FIG. 1, where two fingers concurrently touch the projected capacitive touch sensing device 10, the sensing capacitor strings $X_3$, $X_{m-1}$, $Y_3$ and $Y_{n-1}$ will concurrently sense capacitance variations; thus, it is determined that touch events occur at all points $(X_3, Y_3)$, $(X_3, Y_{n-1})$, $(X_{m-1}, Y_3)$ and $(X_{m-1}, Y_{n-1})$. In fact, only $(X_3, Y_3)$ and $(X_{m-1}, Y_{n-1})$ are real touch points, whereas $(X_3, Y_{n-1})$ and $(X_{m-1}, Y_3)$ are not. This faulty determination of the projected capacitive touch sensing device 10 leads to a detection error where two nonexistent touch points are registered, causing what is known as the "ghost key" phenomenon. Therefore, for multi-touch operations, it is only possible to determine which intersections of the sensing capacitor strings the touch event may have occurred at, instead of a precise and definite touch point.

SUMMARY OF THE INVENTION

A primary objective of the present invention is to provide a zoom gesture determination method and a touch control chip.

The invention discloses a zoom gesture determination method for a touch control device, comprising: detecting a first touch point and a second touch point; determining a position difference between the first touch point and the second touch point; and deciding a zoom gesture represented by the first touch point and the second touch point according to variations in the position difference.

The invention further discloses a touch control chip for a touch control device, the touch control chip comprising: a detecting unit, for detecting a first touch point and a second touch point; a determining unit, for determining a position difference between the first touch point and the second touch point; and a deciding unit, for deciding a zoom gesture represented by the first touch point and the second touch point according to variations in the position difference.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
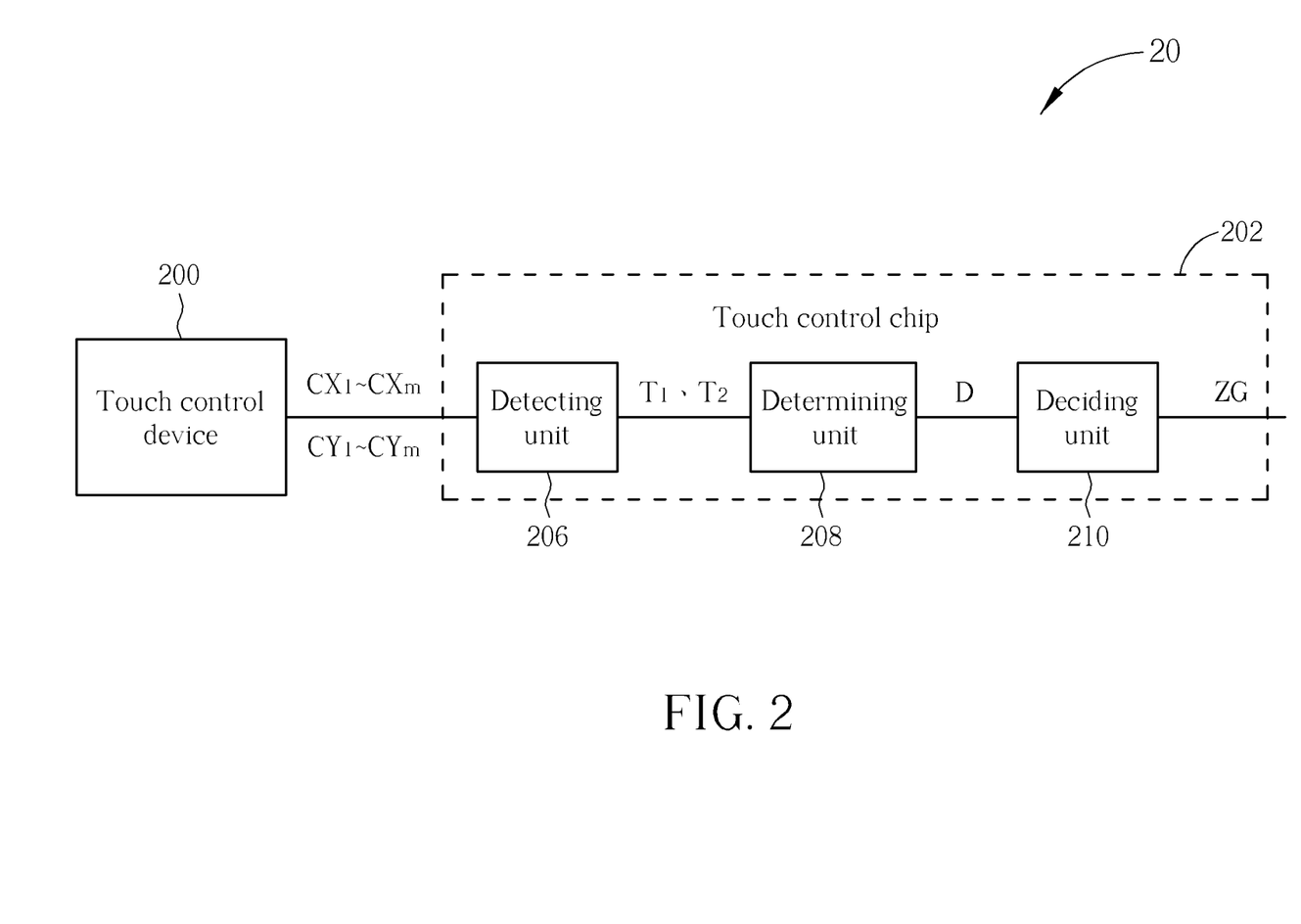
FIG. 2 is a functional block diagram of a touch control system according to an embodiment of the invention.

Please refer to FIG. 2, which is a functional block diagram of a touch control system 20 according to an embodiment of the present invention. The touch control system 20 is composed of a touch control device 200 and a touch control chip 202. The touch control chip 202 includes a detecting unit 206, a determining unit 208, and a deciding unit 210. The detecting unit 206 can detect a first touch point T1 and a second touch point T2 according to detection signals $CX_1$-$CX_m$, $CY_1$-$CY_n$ from the touch control device 200. The determining unit 208 in turn determines a position difference D between the first touch point T1 and the second touch point T2. The deciding unit 210 decides a zoom gesture ZG represented by the first touch point T1 and second touch point T2 according to variations in the position difference D. The detecting unit 206 detects the first touch point T1 and the second touch point T2 according to the detection signals $CX_1$-$CX_m$, $CY_1$-$CY_n$ from the touch control device 200 in a manner similar to that of the conventional projected capacitive sensing device 10; however, unlike the conventional capacitive sensing device which suffers from faulty zoom-gesture determination caused by the "ghost key" effect during multiple-point operations, the deciding unit 210 decides the zoom gesture ZG via variations in the position difference D between the first touch point T1 and the second touch point T2. Therefore, the touch control chip 202 is capable of determining the zoom gesture ZG utilizing the touch control device 200 which employs either self-capacitance or mutual-capacitance.

Figure 3:
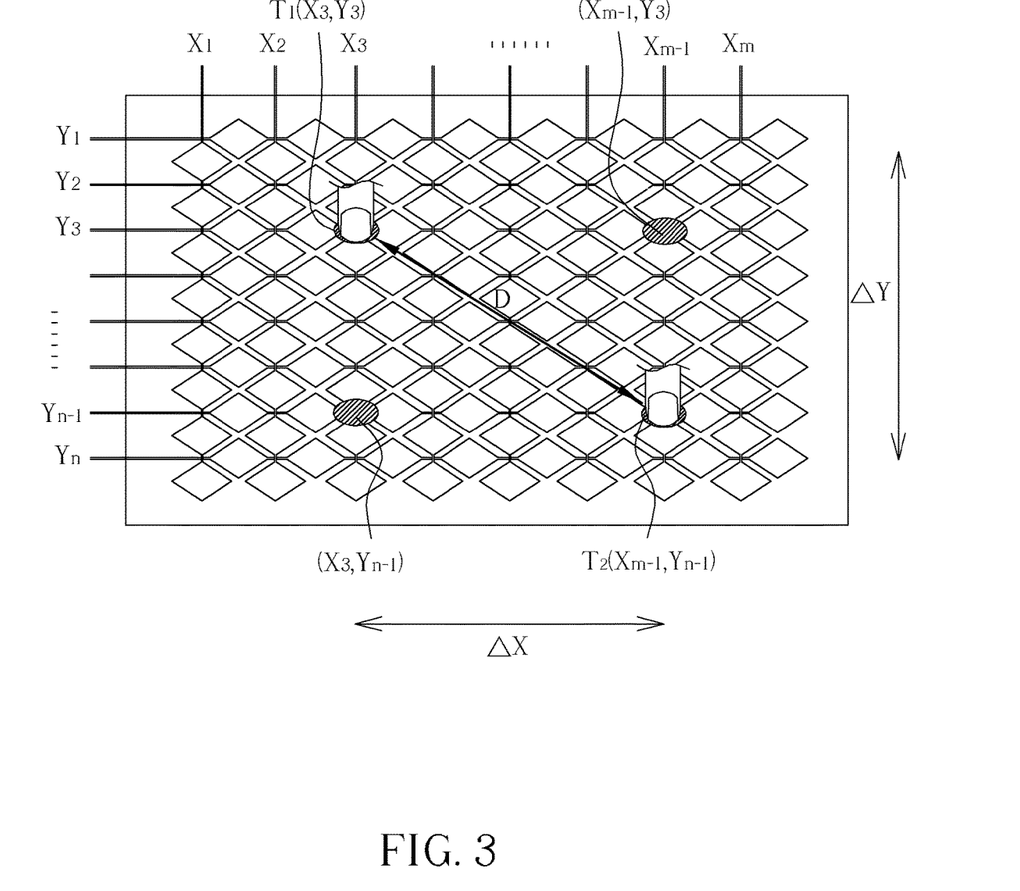
FIG. 3 is a schematic diagram of a touch control chip shown in FIG. 2 detecting a position difference between two touch points.

For more detail, please refer to FIG. 3, which is a schematic diagram of the touch control chip 202 shown in FIG. 2 detecting the position difference D between the touch points T1, T2. As shown in FIG. 3, a determining unit of the touch control chip 202 determines a horizontal position difference $\Delta X$ and a vertical position difference $\Delta Y$ between the first touch point T1 and the second touch point T2 to determine the position difference D between the first touch point T1 and the second touch point T2. When the position difference D is continuously increasing or decreasing, the touch control chip 202 can decide that the zoom gesture ZG represented by the first touch point T1 and the second touch point T2 is a zoom-in or a zoom-out gesture, respectively. The objective of determining the zoom gesture ZG via checking if the position difference D is continuously increasing or decreasing is to avoid faulty determination caused by coordinate bounces during the zoom gesture operations. With FIG. 3 as an example, when the first touch point T1 and the second touch point T2 move towards a top-left and a lower-right direction, the horizontal position difference $\Delta X$ and the vertical position difference $\Delta Y$ between the first touch point T1 and second touch point T2 increase and the position difference D increases accordingly. Therefore, the deciding unit 210 can decide that the zoom gesture ZG represented by the first touch point T1 and the second touch point T2 is a zoom-in gesture. If, however, one of the first touch point T1 or the second touch point T2 leaves the touch control device 200 during the gesture, then the deciding unit 210 determines that the position difference D is not changing continuously, and may therefore decide that the zoom gesture ZG did not occur.

Figure 4A:
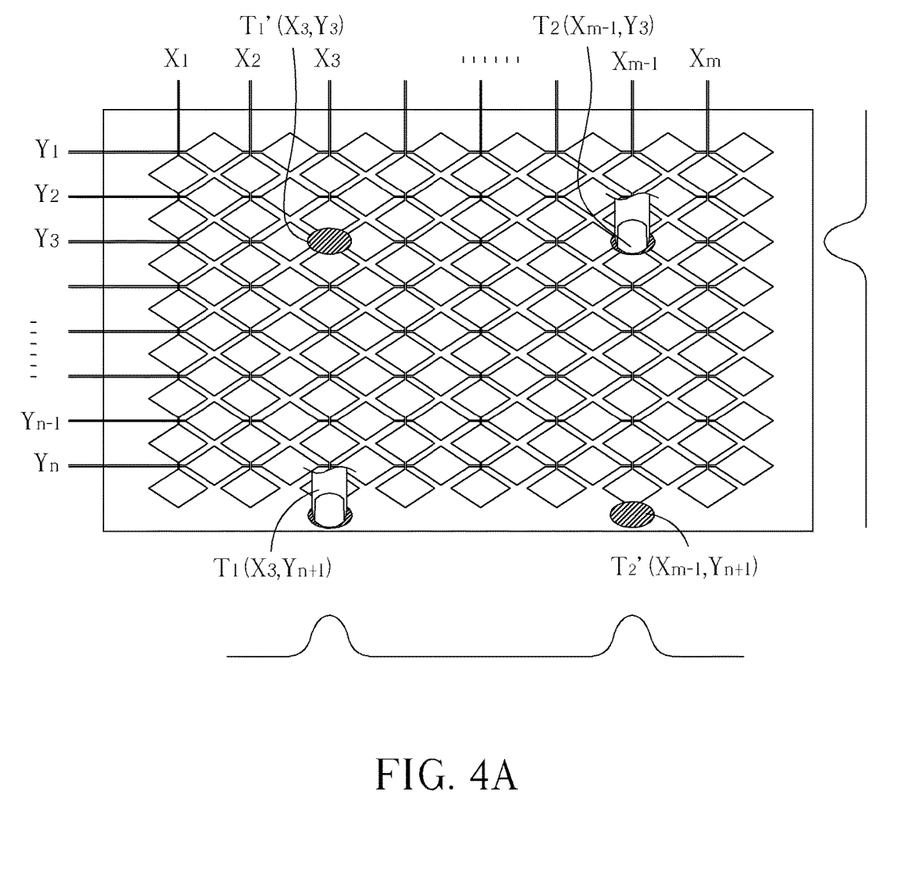
FIGS. 4A and 4B are schematic diagrams of possible faulty determination by the touch control chip shown in FIG. 2 when employed in a self-capacitance sensing touch control device.
Figure 4B:
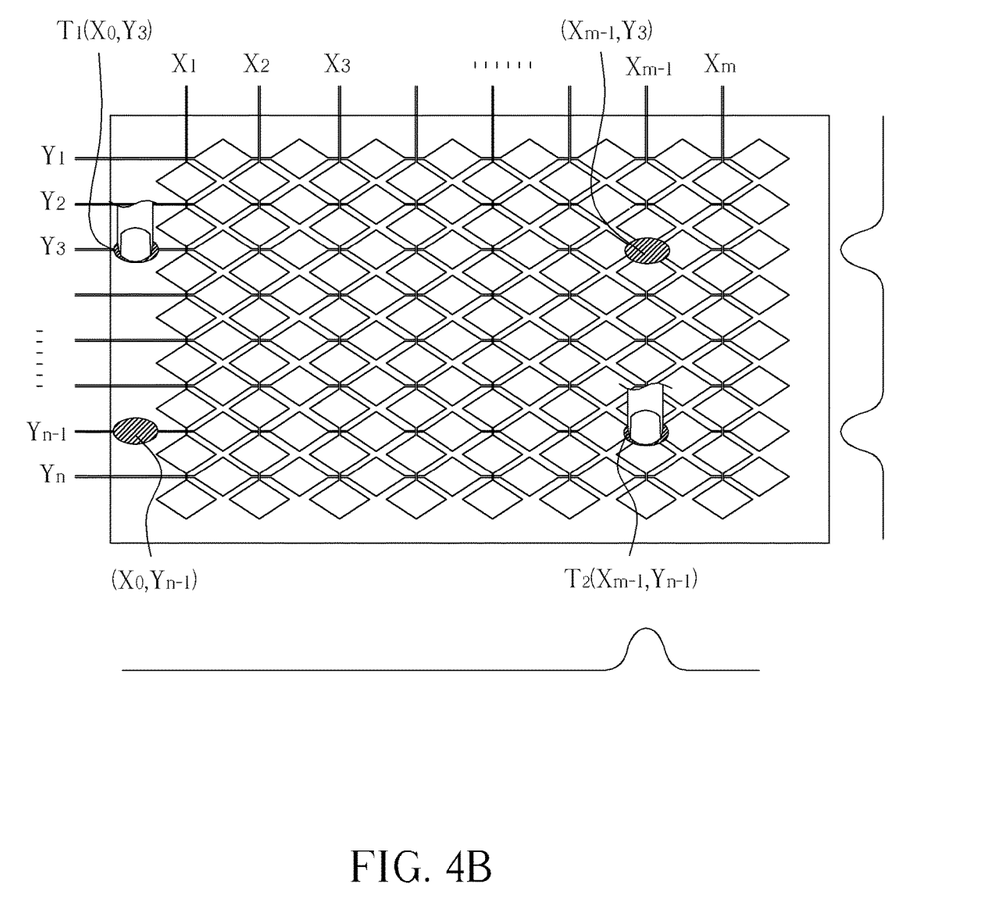

When self-capacitance sensing is utilized, it is possible that when two fingers touch a diagonal of the touch control device 200, the deciding unit 210 incorrectly determines that two horizontal touch points or two vertical touch points are present. Please refer to FIGS. 4A and 4B, which are schematic diagrams of possible faulty determinations by the touch control chip 202 shown in FIG. 2 when employed in a self-capacitance sensing touch control device. As shown in FIG. 4A, two fingers touch two points $(X_{m-1}, Y_3)$ and $(X_3, Y_{n+1})$ on the touch control device 200, respectively. One finger has a vertical coordinate $Y_{n+1}$ outside a detection range of the vertical sensing capacitor strings $Y_1$-$Y_n$ of the touch control device 200. Therefore, only the sensing capacitor strings $X_3$, $X_{m-1}$, and $Y_3$ would concurrently sense capacitance variations, leading to an erroneous determination that a touch event is occurring at points $(X_3, Y_3)$ and $(X_{m-1}, Y_3)$. In other words, when determining a position difference between the two touch points, the determining unit 208 would incorrectly determine that the vertical position difference $\Delta Y$ is zero, causing a subsequent faulty determination of the zoom gesture. Similarly, please refer to FIG. 4B, which illustrates when two fingers touch two points $(X_0, Y_{n-1})$ and $(X_{m-1}, Y_3)$ on the touch control device 200, respectively, and one finger has a horizontal coordinate $X_0$ outside a detection range of horizontal sensing capacitor string $X_1$-$X_n$ of the touch control device 200. Only the sensing capacitor strings $X_{m-1}, Y_3, Y_{n-1}$ would concurrently sense capacitance variations, leading to an erroneous determination that a touch event is occurring at points $(X_{m-1}, Y_3)$, $(X_{m-1}, Y_{n-1})$. In other words, when determining a position difference between the two touch points, the determining unit 208 would incorrectly determine that the horizontal position difference $\Delta X$ is zero, causing a subsequent faulty determination of the zoom gesture.

Therefore, according to an embodiment of the invention, the deciding unit 210 further utilizes a de-bounce mechanism to filter out the situation in which two fingers touch a diagonal of the touch control device 200, but two erroneous horizontal touch points or two vertical touch points are transiently sensed. Specifically, the detecting unit 206 first detects whether both the first touch point T1 and the second touch point T2 are present. When only a single touch point (or even no touch point) is detected on the touch control device 200, the detecting unit 206 may directly end the de-bounce mechanism, without performing subsequent determination. When the detecting unit 206 detects both the first touch point T1 and the second touch point T2, and the determining unit 208 determines that neither the horizontal position difference $\Delta X$ or the vertical position difference $\Delta Y$ between the first touch point T1 and the second touch point T2 is zero, this represents that the two touch points are on a diagonal of the touch control device 200, and both within detection ranges of the horizontal and the vertical sensing capacitor strings $X_1$-$X_n$, $Y_1$-$Y_n$. Therefore, the de-bounce mechanism may be ended, and normal zoom-gesture determination may be performed. When one of the horizontal position difference $\Delta X$ or the vertical position difference $\Delta Y$ between the first touch point T1 and the second touch point T2 is zero, it is required to further determine whether the first touch point T1 and the second touch point T2 are indeed horizontally or vertically arranged. It is possible that a faulty determination has occurred because one of the touch points is outside the detection range of the touch control device 200. A counter may be utilized to keep count of a number of times for which the horizontal position difference $\Delta X$ or vertical position difference $\Delta Y$ between the first touch point T1 and second touch point T2 is zero, in order to generate a cumulative value. If the cumulative value is greater than a threshold value, it can then be determined that the first touch point T1 and the second touch point T2 are indeed horizontally or vertically arranged.

Suppose that the first touch point T1 and the second touch point T2 are at positions as shown in FIG. 4A, respectively, and the threshold value is 3. Initially, the determining unit 208 determines that the horizontal position difference $\Delta X$ between the first touch point T1 and the second touch point T2 is zero, and the cumulative value of the counter increases. Suppose that the first touch point T1 and the second touch point T2 gradually close in on each other. When the first touch point T1 re-enters the vertical detection range of the touch control device 200, the cumulative value is reset to zero, and the determining unit 208 correctly determines that the first touch point T1 and the second touch point T2 are at a diagonal, and not horizontally arranged. Therefore, the deciding unit 210 can also correctly determine that the gesture ZG is a zoom-out gesture. Conversely, if the touch points are at positions T1' and T2 shown in FIG. 4A, respectively, and are moving away from each other along a horizontal direction, the counter counts the number of times for which the vertical position difference $\Delta Y$ between T1' and T2 is zero. When the cumulative value exceeds the threshold value 3, the determining unit 208 and the deciding unit 210 can correctly determine that T1' and T2 are indeed horizontally arranged, and represent a zoom-in gesture. As a result, faulty determination is prevented, and it is possible to filter out the situation wherein two fingers touch a diagonal on the touch control device 200, yet two erroneous horizontal or vertical touch points are transiently sensed.

Figure 5:
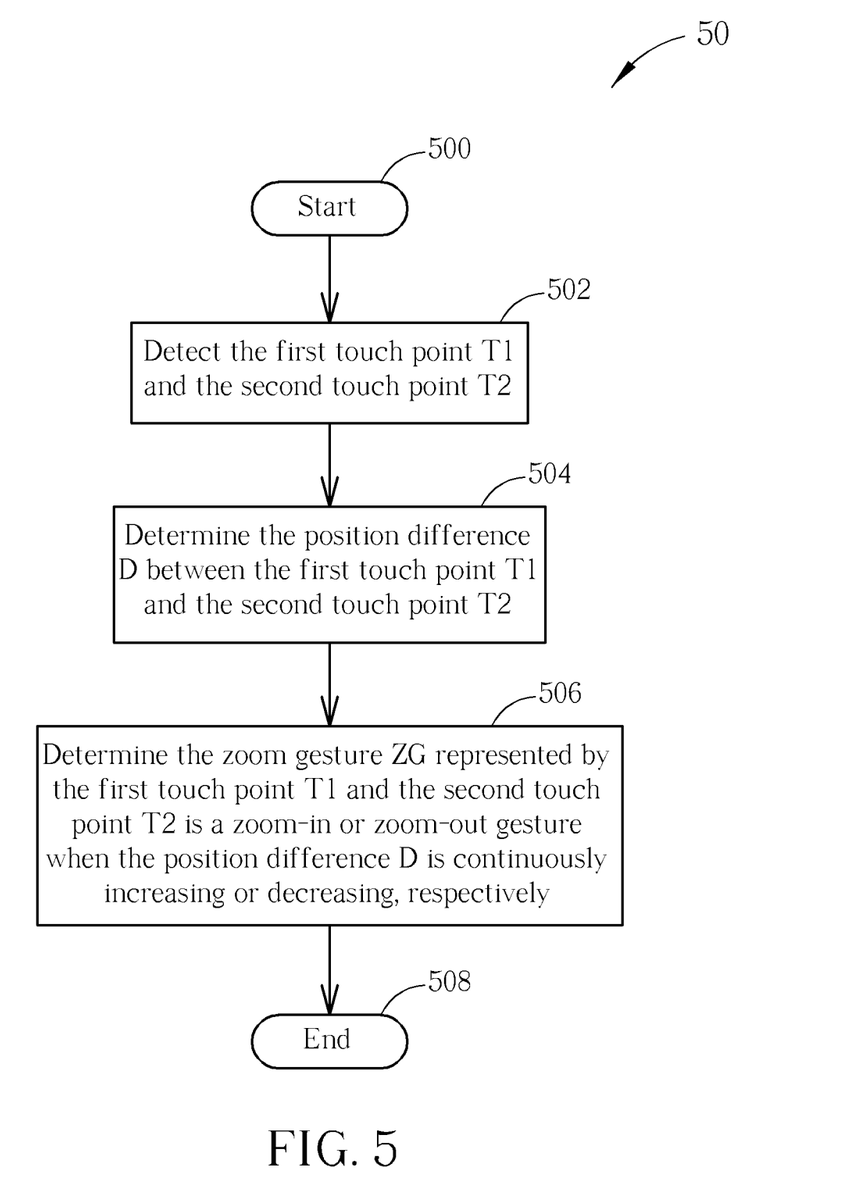
FIG. 5 is a schematic diagram of a zoom gesture determination process according to an embodiment of the invention.

Above-mentioned operations of the deciding unit 210 deciding the zoom gesture ZG according to variations in the position difference D may be summarized into a zoom gesture determination process 50, as shown in FIG. 5. The determination process 50 comprises the following steps:

Step 500: Start;

Step 502: Detect the first touch point T1 and the second touch point T2;

Step 504: Determine the position difference D between the first touch point T1 and the second touch point T2;

Step 506: Determine the zoom gesture ZG represented by the first touch point T1 and the second touch point T2 is a zoom-in or zoom-out gesture when the position difference D is continuously increasing or decreasing, respectively;

Step 508: End.

Figure 6:
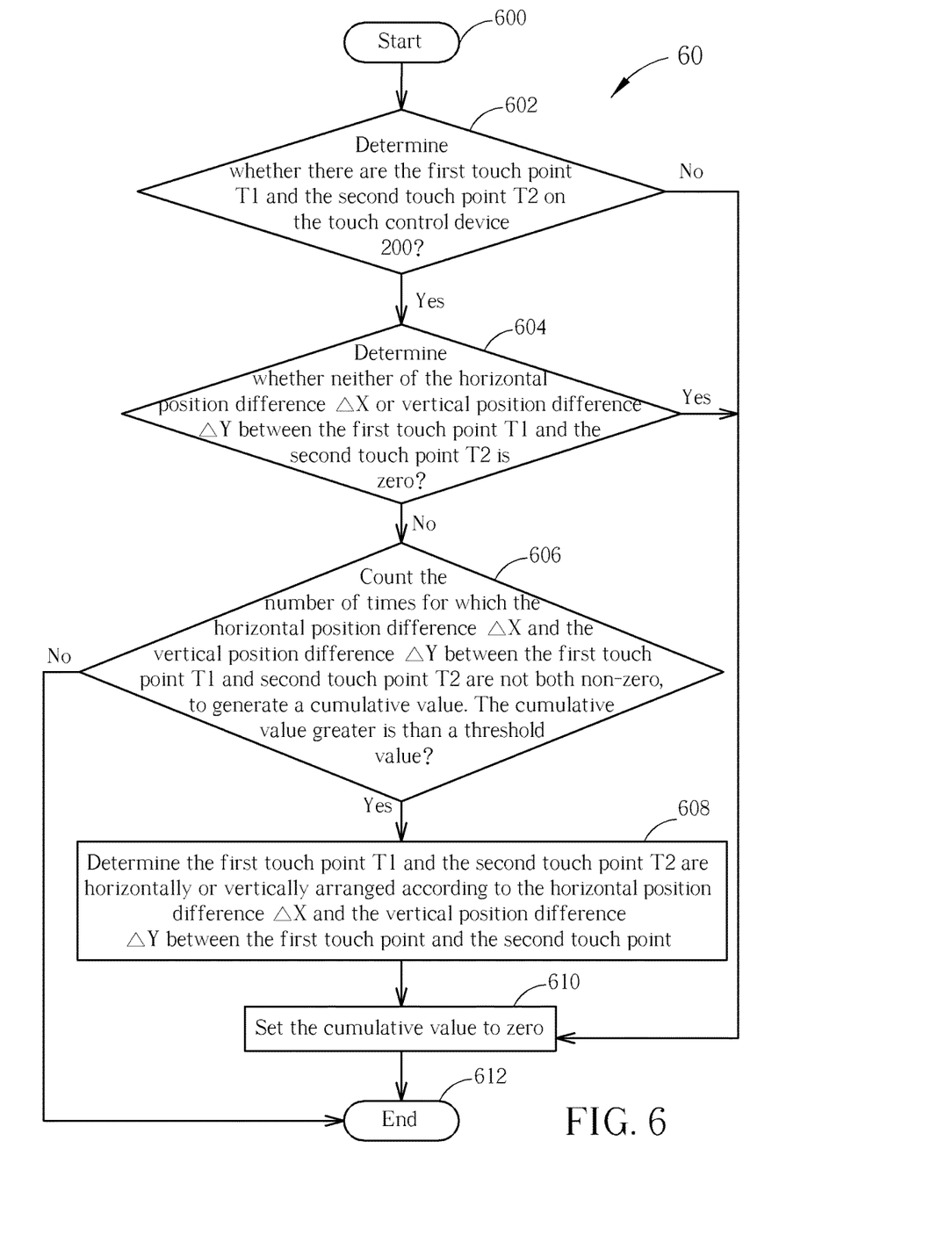
FIG. 6 is a schematic diagram of a de-bounce mechanism process according to an embodiment of the invention.

Similarly, operations of the de-bounce mechanism may be summarized into a de-bounce mechanism process 60, as shown in FIG. 6, comprising the following steps:

Step 600: Start;

Step 602: Determine whether the first touch point T1 and the second touch point T2 are on the touch control device 200. If so, perform Step 604; else, perform Step 610;

Step 604: Determine whether neither the horizontal position difference ΔX nor vertical position difference ΔY between the first touch point T1 and the second touch point T2 is zero. If so, perform Step 610; else, perform Step 606;

Step 606: Count the number of times for which the horizontal position difference ΔX and the vertical position difference ΔY between the first touch point T1 and second touch point T2 are not both non-zero, to generate a cumulative value. If the cumulative value is greater than a threshold value, perform Step 608; else, perform Step 612;

Step 608: Determine whether the first touch point T1 and the second touch point T2 are horizontally or vertically arranged according to the horizontal position difference ΔX and the vertical position difference ΔY between the first touch point and the second touch point;

Step 610: Set the cumulative value to zero;

Step 612: End.

Detailed descriptions of the zoom gesture determination process 50 or the de-bounce mechanism process 60 may be found in the above, and are therefore not repeated here.

Figure 7:
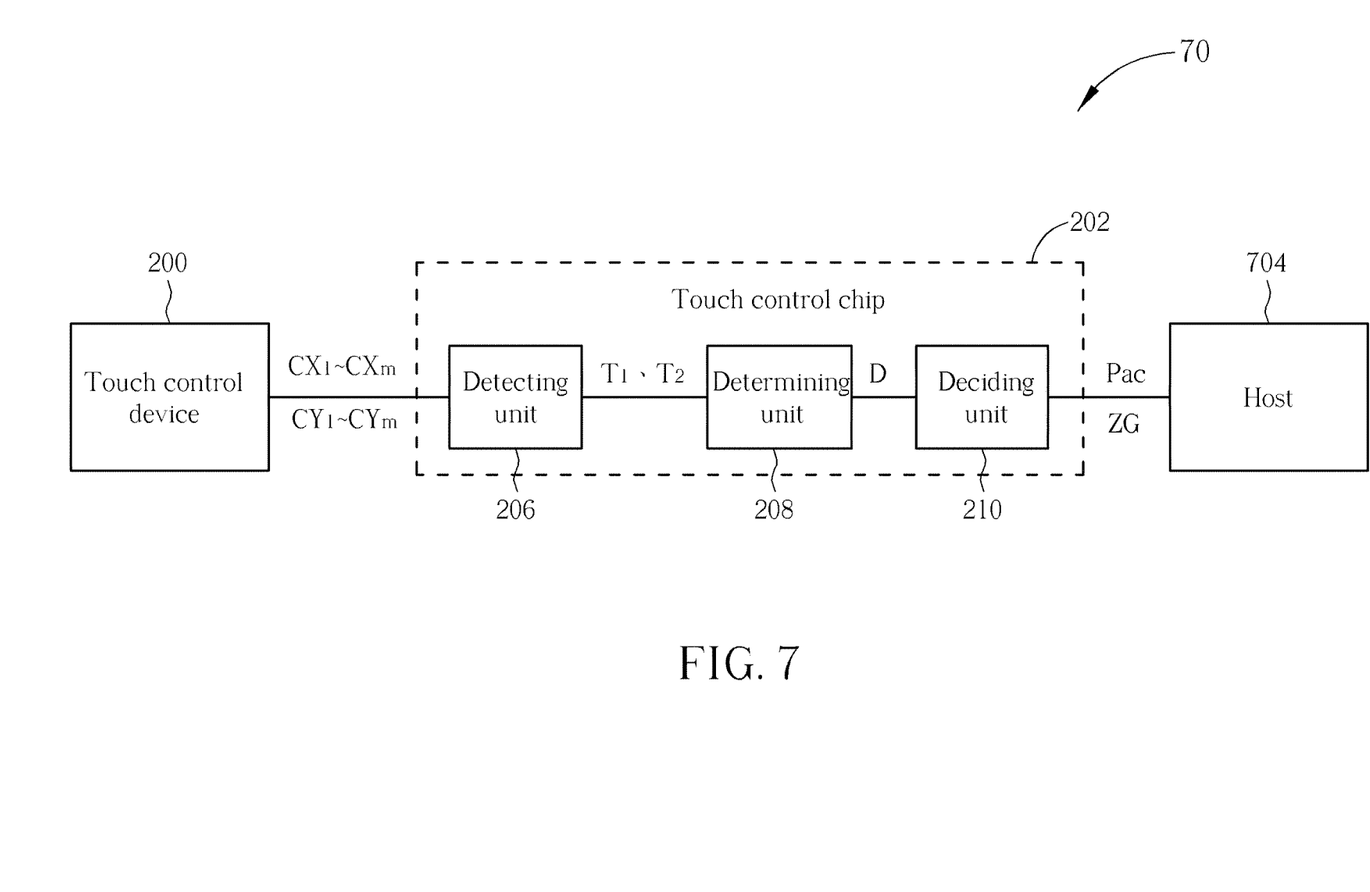
FIG. 7 is a schematic diagram of a computer system 70 according to an embodiment of the invention.

Furthermore, through suitably incorporating a touch control device and a host, it is possible to extend the touch control system 20 in the above-mentioned embodiment to be implemented in a computer system. Please refer to FIG. 7, which is a schematic diagram of a computer system 70 according to an embodiment of the invention. As shown in FIG. 7, the computer system 70 is primarily composed of the touch control system 20 shown in FIG. 2 and a host 704. The touch control device 200 is capable of sensing an object to be detected (e.g. a finger, a pen, etc) and generating one or more detection signals indicating a position of the object to be detected on a detecting panel (not shown). The touch control chip 202 can utilize the above-mentioned zoom gesture determination method and decide the zoom gesture ZG represented by two touch points on the touch control device 200 via variations of the position difference between the touch points. The touch control chip 202 transmits a packet Pac representing the zoom gesture ZG to the host 704. Preferably, the packet Pac includes a byte of zoom gesture ID code and a byte of zoom direction code, to indicate the host 704 that a zoom gesture has occurred, and that the zoom gesture is a zoom-in or a zoom-out gesture. Format of the packet Pac is not limited, and those skilled in the art may make modifications or variations accordingly.

Note that the above-mentioned embodiment utilizing variations in the position difference between two touch points to determine multi-point gestures is not limited to the above-described features, and suitable modifications may be made by those skilled in the art. For example, the determining unit 208 and the deciding unit 210 may further determine a rotation gesture according to position difference variations between the touch points. For example, in FIG. 3, if the position difference D between the first touch point T1 and the second touch point T2 remains constant, and the vertical position difference ΔY decreases, it can be determined that T1 and T2 represent a counter-clockwise rotation gesture.

In summary, the zoom gesture determination method of the invention utilizes detecting variations in the position difference between two touch points to decide a zoom gesture represented by the two touch points. Therefore, it is possible for touch control devices employing both self-capacitance and mutual-capacitance sensing to utilize the disclosed gesture determination method. Faulty determination caused by physical limitations of conventional self-capacitance sensing touch control devices can thereby be resolved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A zoom gesture determination method for a touch control device, comprising:

detecting a first touch point and a second touch point, wherein the first touch point and the second touch point are simultaneously on the touch control device;

determining a position difference between the first touch point and the second touch point, comprising determining a horizontal position difference and a vertical position difference between the first touch point and the second touch point; and deciding a zoom gesture represented by the first touch point and the second touch point according to variations in the position difference, wherein the step of deciding the zoom gesture represented by the first touch point and the second touch point according to variations in the position difference comprises:

deciding whether the zoom gesture represented by the first touch point and the second touch point is a zoom-in gesture or a zoom-out gesture according to whether the position difference is continuously increasing or continuously decreasing.

2. The zoom gesture determination method of claim 1, further comprising:

when the horizontal position difference or the vertical position difference is zero, utilizing a de-bounce mechanism to decide whether the first touch point and the second touch point are truly horizontally or vertically arranged.

3. The zoom gesture determination method of claim 2, wherein the de-bounce mechanism is to filter out a situation that two fingers touch a diagonal of the touch control device but two erroneous horizontal touch points or two erroneous vertical touch points are transiently sensed.

4. The zoom gesture determination method of claim 2, wherein the de-bounce mechanism is to decide whether one plane coordinate of the first touch point or one plane coordinate of the second touch point is outside a plane detection range of a horizontal sensing capacitor string or a vertical sensing capacitor string of the touch control device.

5. The zoom gesture determination method of claim 2, wherein the step of utilizing the de-bounce mechanism to decide whether the first touch point and the second touch point are truly horizontally or vertically arranged comprises:
continuously detecting the first touch point and the second touch point;
counting a number of times for which the horizontal position difference or the vertical position difference between the first touch point and the second touch point is zero, to generate a cumulative value; and
comparing the cumulative value with a threshold value, and deciding the first touch point and the second touch point are truly horizontally or vertically arranged when the cumulative value is greater than the threshold value.

6. The zoom gesture determination method of claim 5 further comprising:
setting the cumulative value to zero when neither of the horizontal position difference and the vertical position difference is zero.

7. The zoom gesture determination method of claim 1, wherein the step of deciding the zoom gesture represented by the first touch point and the second touch point according to variations in the position difference is performed at least for cases where none of the horizontal position difference and the vertical position difference is decided to be zero.

8. The zoom gesture determination method of claim 1, wherein when the horizontal position difference or the vertical position difference is zero, the step of deciding the zoom gesture represented by the first touch point and the second touch point according to variations in the position difference is not performed until the first touch point and the second touch point are decided to be truly horizontally or vertically arranged.

9. A touch control chip for a touch control device, the touch control chip comprising:
a detecting unit, for detecting a first touch point and a second touch point, wherein the first touch point and the second touch point are simultaneously on the touch control device;
a determining unit, for determining a position difference between the first touch point and the second touch point; and
a deciding unit, for deciding a zoom gesture represented by the first touch point and the second touch point according to variations in the position difference;
wherein the determining unit determines a horizontal position difference and a vertical position difference between the first touch point and the second touch point to determine the position difference between the first touch point and the second touch point;
wherein the deciding unit decides whether the zoom gesture represented by the first touch point and the second touch point is a zoom-in gesture or a zoom-out gesture according to whether the position difference is continuously increasing or continuously decreasing.

10. The touch control chip of claim 9, wherein the deciding unit utilizes a de-bounce mechanism to decide whether the first touch point and the second touch point are truly horizontally or vertically arranged when the horizontal position difference or the vertical position difference is zero.

11. The touch control chip of claim 10, wherein the de-bounce mechanism is to filter out a situation that two fingers touch a diagonal of the touch control device but two erroneous horizontal touch points or two erroneous vertical touch points are transiently sensed.

12. The touch control chip of claim 10, wherein the de-bounce mechanism is to decide whether one plane coordinate of the first touch point or one plane coordinate of the second touch point is outside a plane detection range of a horizontal sensing capacitor string or a vertical sensing capacitor string of the touch control device.

13. The touch control chip of claim 10, wherein the deciding unit continuously detects the first touch point and the second touch point, and counts a number of times for which the horizontal position difference or the vertical position difference between the first touch point and the second touch point is zero to generate a cumulative value, and after comparing the cumulative value with a threshold value, the deciding unit decides the first touch point and the second touch point are truly horizontally or vertically arranged when the cumulative value is greater than the threshold value.

14. The touch control chip of claim 13, wherein the deciding unit sets the cumulative value to zero when neither of the horizontal position difference and the vertical position difference is zero.

15. The touch control chip of claim 9, wherein the deciding unit decides the zoom gesture represented by the first touch point and the second touch point according to variations in the position difference at least for cases where none of the horizontal position difference and the vertical position difference is decided to be zero.

16. The touch control chip of claim 9, wherein when the horizontal position difference or the vertical position difference is zero, the deciding unit does not decide the zoom gesture represented by the first touch point and the second touch point according to variations in the position difference until the first touch point and the second touch point are decided to be truly horizontally or vertically arranged.

17. A zoom gesture determination method for a touch control device, comprising:
detecting a first touch point and a second touch point;
determining a position difference between the first touch point and the second touch point, comprising determining a horizontal position difference and a vertical position difference between the first touch point and the second touch point; and
deciding a zoom gesture represented by the first touch point and the second touch point according to variations in the position difference; and
when the horizontal position difference or the vertical position difference is zero, utilizing a de-bounce mechanism to decide whether the first touch point and the second touch point are truly horizontally or vertically arranged.

18. A touch control chip for a touch control device, the touch control chip comprising:
a detecting unit, for detecting a first touch point and a second touch point;
a determining unit, for determining a position difference between the first touch point and the second touch point; and
a deciding unit, for deciding a zoom gesture represented by the first touch point and the second touch point according to variations in the position difference;
wherein the determining unit determines a horizontal position difference and a vertical position difference between the first touch point and the second touch point to determine the position difference between the first touch point and the second touch point;
wherein the deciding unit utilizes a de-bounce mechanism to decide whether the first touch point and the second touch point are truly horizontally or vertically arranged when the horizontal position difference or the vertical position difference is zero.

\* \* \* \* \*